(12) United States Patent
Polleres

(10) Patent No.: US 8,991,592 B2
(45) Date of Patent: Mar. 31, 2015

(54) BALL GUIDE AND METHOD FOR GUIDING BALLS

(75) Inventor: Wolfgang Polleres, Gumpoldskirchen (AT)

(73) Assignee: Novomatic AG (AT)

( * ) Notice: Subject to any disclaimer, the term of this patent is extended or adjusted under 35 U.S.C. 154(b) by 0 days.

(21) Appl. No.: 13/980,491

(22) PCT Filed: Jan. 23, 2012

(86) PCT No.: PCT/IB2012/050310
§ 371 (c)(1),
(2), (4) Date: Jul. 18, 2013

(87) PCT Pub. No.: WO2012/098536
PCT Pub. Date: Jul. 26, 2012

(65) Prior Publication Data
US 2013/0299312 A1    Nov. 14, 2013

(30) Foreign Application Priority Data

Jan. 21, 2011  (EP) .................................. 11450009

(51) Int. Cl.
*B65G 13/02* (2006.01)
*G07C 15/00* (2006.01)
*B65G 11/06* (2006.01)

(52) U.S. Cl.
CPC .............. *G07C 15/001* (2013.01); *B65G 11/06* (2013.01)
USPC .............................. 198/778; 193/12; 221/220

(58) Field of Classification Search
CPC ........ B65G 21/18; B65G 11/06; G07F 11/44; G07F 11/54
USPC ...................... 198/778; 193/12; 221/195, 200
See application file for complete search history.

(56) References Cited

U.S. PATENT DOCUMENTS

| 468,553 | A | * | 2/1892 | Shaw ............................... 193/12 |
| 1,016,568 | A | * | 2/1912 | Landes ............................ 193/12 |
| 2,299,403 | A | * | 10/1942 | Mozel ........................ 221/312 R |
| 4,501,380 | A | * | 2/1985 | Welch ............................ 221/298 |
| 4,588,108 | A | * | 5/1986 | Knez et al. ...................... 221/68 |
| 4,667,847 | A | * | 5/1987 | Tucom .......................... 221/200 |
| 6,080,061 | A |   | 6/2000 | Watanabe et al. |
| 7,775,521 | B1 |  | 8/2010 | Itkis et al. |
| 2004/0256800 | A1 | | 12/2004 | Campo et al. |

(Continued)

FOREIGN PATENT DOCUMENTS

| DE | 20005276 | 8/2000 |
| EP | 0828234 | 3/1998 |
| ES | 2163377 | 1/2002 |

(Continued)

OTHER PUBLICATIONS

Website http://web.archive.org/web/20071206135612/http://www.neurallabs.net/en/Rec.-Bolas-bingo-4.html Dated Dec. 6, 2007, 2 Pages, "The systems that work read license plates with Neural Labs technology.".
Neural Labs May, 2007, 13 Pages, "BBAR v.2.0.00 Bingo Balls Automatic Reader Dll Function Reference."
Neural Labs Feb. 2007, 4 Pages, "BBAR v.1.2.00 Bingo Balls Automatic Reader Technical Manual."

(Continued)

*Primary Examiner* — James R Bidwell
(74) *Attorney, Agent, or Firm* — Brooks Kushman P.C.

(57) ABSTRACT

A ball guide having a body for receiving and guiding balls of a specified size along a specified path that is defined by the body. At least one vibration generator is provided which is connected to the body in a vibration-transmitting manner.

10 Claims, 5 Drawing Sheets

(56) References Cited

U.S. PATENT DOCUMENTS

2006/0105833 A1 5/2006 Lin
2006/0196488 A1 9/2006 Morshed et al.

FOREIGN PATENT DOCUMENTS

| | | |
|---|---|---|
| FR | 2577429 | 8/1986 |
| JP | 8280902 | 10/1996 |
| JP | 2008246237 | 10/2008 |

OTHER PUBLICATIONS

Cheriet et al. Wiley Character Recognition Systems 2007, 52 Pages, "A Guide for Students and Practitioners."

Huang et al. IEEE Youth Conference on Information, Computing and Telecommunication Sep. 20, 2009, p. 510-513, "Number Ball Recognition At Arbitrary Pose Using Multiple View Instances."

International Search Report for PCT/IB2012/050310, English Translation attached to original, Both Completed by the European Patent Office on Apr. 5, 2012, All together 7 Pages.

* cited by examiner

BALL GUIDE AND METHOD FOR GUIDING BALLS

CROSS-REFERENCE TO RELATED APPLICATION

This application is the U.S. national phase of PCT Application No. PCT/IB2012/050310 filed on Jan. 23, 2012, which claims priority to EP Patent Application No. 11450009.3 filed on Jan. 21, 2011, the disclosures of which are incorporated in their entirety by reference herein.

The invention relates to a ball guide and to a method for guiding balls without problems.

FIELD OF THE INVENTION

Methods and apparatuses according to the invention are used, in particular, for automatically drawing balls in order to generate random numbers in games of luck, for example bingo or lotteries.

BACKGROUND OF THE INVENTION

Ball drawing devices and ball drawing machines form the background of the invention. Devices and machines of this kind are used to determine winning numbers, for example for bingo and for other lottery games. A known ball drawing device has a drawing drum which is mounted in hollow shaft stubs, can be rotated in two directions about its shafts, preferably consists of a transparent hollow ball and into which a more or less high number of balls, which are provided with numbers, are introduced through the shaft stub, are mixed when the drawing drum is rotated in one direction, and are discharged one after the other with the aid of a discharge apparatus through the other hollow shaft stub when the drawing drum is rotated in the other direction, wherein the discharge apparatus has a helical channel which extends from the inner edge of the drawing drum to the discharge stub and which supplies the respectively first ball from amongst the balls which are accommodated by the channel to the discharge apparatus. In order to discharge the balls to an identification apparatus, the balls are guided by means of a ball guide with a rod.

A further known ball drawing device has a ball guide which has a ball track which is defined by means of rods which extend in the track direction.

A large number of different methods and apparatuses with which random numbers can be drawn is also known in the prior art. Many of these systems have relatively long ball guides which are intended to provide optical encouragement to the player and are intended to motivate said player to play more games. In particular, it is known to supply balls to the drawing drum via ball guides and to discharge the balls from the drawing drum via a ball guide after the balls are drawn.

In relatively long ball guides, in particular when the ball guide is additionally curved, the problem of individual balls possibly becoming stuck in the ball guide can arise.

This problem occurs, in principle, in ball guides, wherein the balls may lose speed and may even become stuck in the course of the ball track in specific situations, in particular when the ball track has a closely wound or helical profile. A situation of this kind leads to the respective game of luck having to be stopped and any cover which may be present having to be removed. A servicing engineer has to free the stuck ball from the ball drawing device and restart the game; furthermore, the device which has been closed again has to be resealed by an authorized office.

An event of this kind leads to the need for additional expenditure on servicing and to the respective ball drawing device stopping during the servicing work and the operator of the machine being able to arrange fewer games. If several balls become stuck during the course of play, for example over an evening, this can lead to a very considerable loss of takings for the machine operator when there are a large number of players. In addition, it may give the players the impression that they are being cheated by the operator of the machine or that the operator is manipulating the games.

The object of the invention is to prevent individual balls becoming stuck and to provide a ball guide and also a method of the type cited in the introductory part in which balls can be forwarded or led through without problems.

SUMMARY OF THE INVENTION

According to the invention, at least one vibration transmitter, which is connected to the body so as to transmit vibrations, is associated with a body for accommodating and guiding balls of a predefined size along a predefined path, which is defined by the body, in a ball guide. As a result, balls which are stuck in the body can be shaken free and the balls can be prevented from becoming stuck in the body in an effective manner.

A particularly simple embodiment of a ball guide can be achieved when the vibration transmitter is formed by an eccentric motor or unbalance motor, wherein an eccentric weight is preferably arranged on the shaft of the eccentric motor or unbalance motor on the output shaft thereof.

The balls can be guided in a particularly simple manner and an additional improvement in the running properties of the balls is achieved when the body has a number of guide rods which run along the predefined path and are at an, in particular parallel, distance from one another and/or are curved and surround the predefined path in such a way that a ball (2) of the predefined size can be guided along the predefined path between the guide rods.

In order to increase the mechanical stability of the ball guide, provision can be made for the guide rods to run parallel to one another and define the predefined path.

The stability can further be increased by the guide rods being firmly held in relation to one another at a number of positions, which are predefined along the predefined path and are spaced apart, in particular uniformly, along the predefined path, by cross-connections, wherein the cross-connections preferably have a central recess for feeding through a ball.

In order to improve transmission of the vibrations and to, in association, reduce the probability of balls becoming stuck in the ball guide, provision can be made for the vibration transmitter or the vibrating part of the vibration transmitter to be connected to at least one of the guide rods or to one of the cross-connections so as to transmit vibrations.

Provision can further be made for the body to be tubular and, in particular, transparent, and preferably to be composed of transparent plastic, wherein the path runs in the interior of the body. As a result, balls can be guided in a particularly simple manner and without becoming stuck.

In order to reduce the expenditure on assembly and for improved transmission of the vibrations to the ball guide, provision can be made for the vibration transmitter to be connected, in particular screwed, to an, in particular metal, strut so as to transmit vibrations, and for the strut to be connected, in particular screwed, to the body, in particular to one of the guide rods or one of the cross-connections, and possibly to pass through it.

In order to reduce the loading on the vibration unit and in order to extend the service life of the vibration unit, provision can be made for a unit establishing that a ball has become stuck in the ball guide to be provided, wherein the unit activates the vibration transmitter when it is established that a ball has become stuck.

In order to reduce the energy requirement and in order to increase the effectiveness of the vibration transmitter, provision can further be made for the vibration transmitter to be set to a frequency which corresponds to the resonant frequency of the ball guide.

The noise which is generated by the vibration is largely avoided or considerably reduced as a result of this.

The invention further relates to a ball drawing machine comprising a drawing unit, in particular in the form of a drawing drum, for accommodating and randomly selecting balls and also comprising at least one ball guide as claimed in one of the preceding claims for discharging drawn balls from, or for supplying balls to, the drawing unit.

This ball drawing machine has the significant advantage that drawn balls become stuck in the ball guides less frequently.

The invention further relates to a method for guiding balls, wherein at least one ball is guided and/or moved in the ball guide, and the ball guide is made to vibrate or oscillate. This method has the significant advantage that balls become stuck within the ball guide less frequently.

In this case, provision can be made, in particular, for the resonant frequency of the ball guide to be determined by calibration in advance and for the ball guide to be subjected to oscillation or vibration at the resonant frequency.

By virtue of this measure, the energy required to generate the vibration can be reduced and the effect generated by the vibration when shaking stuck balls free can be intensified.

In addition or as an alternative, provision can further be made, during the movement of the ball in the ball guide, for a check to be made to determine whether a ball is stuck in the ball guide, and for the ball guide to be made to vibrate or oscillate only if the ball becomes stuck in the ball guide. The noise which is generated by the vibration is largely avoided or considerably reduced as a result of this An embodiment of the invention will be explained in greater detail with reference to the following drawings, without restricting the general inventive concept.

DESCRIPTION OF A PREFERRED
EMBODIMENT OF THE INVENTION

Figure 1:
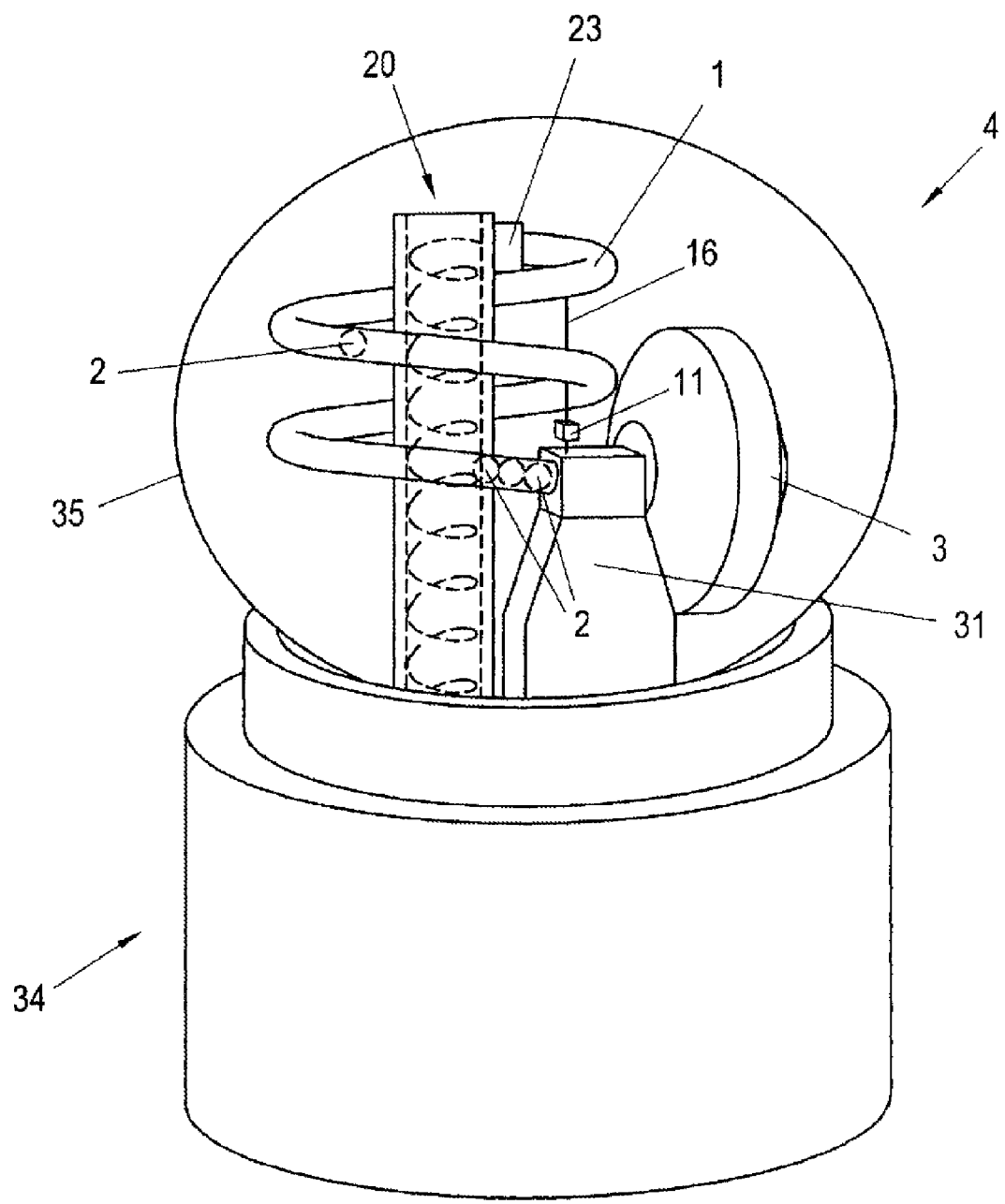
FIG. 1 shows a ball drawing machine.

FIG. 1 shows a ball drawing machine 4 for drawing balls 2 for bingo. In the present case, the ball drawing machine is a machine arrangement 4 having a base 34 and a ball drawing machine which is mounted on the base 34. A spherical glass casing is arranged around the ball drawing machine as a cover 35 which prevents a player from having direct access to the ball drawing machine. The glass casing is transparent in the present case. This has the advantage, in particular, that the ball drawing arrangement or machine arrangement 4 can be positioned or arranged centrally in rooms and that individual players can take a position around the machine arrangement 4. As an alternative, the glass casing can also be at least partially or totally opaque, wherein the important parts of the gaming machine can advantageously be seen.

In the present case, this cover 35 is spherical, however, on account of its main purpose of protecting the machine against access by players, any other desired shape, for example a cylindrical shape or a conical shape, can be selected, provided that access to the ball drawing machine by individual players is prevented.

Figure 2:
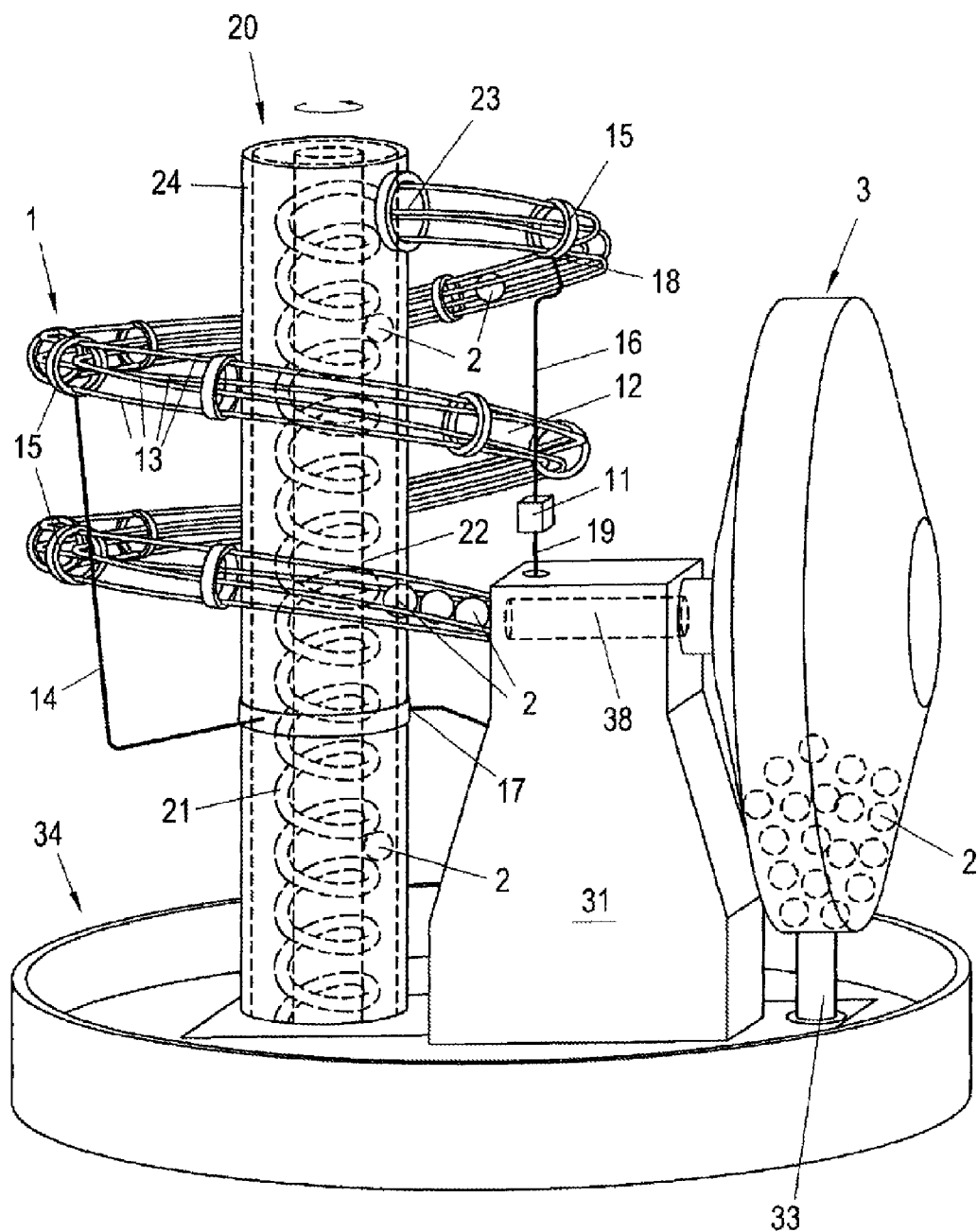
FIG. 2 shows a detail of the ball drawing machine illustrated in FIG. 1.

FIG. 2 shows the ball drawing machine illustrated in FIG. 1 in detail, wherein the spherical cover 35 illustrated in FIG. 1 is not illustrated in FIG. 2.

FIG. 2 shows a ball drawing machine, which is arranged on the base 34, comprising a bearing and supporting part 31 which is firmly connected to the base 34 and sits on said base. The bearing and supporting part 31 serves for mounting a drawing unit 3 which is in the form of a drawing drum. The drawing drum or drawing unit 3 is mounted such that it can rotate about a horizontal axis with respect to the bearing and supporting part 31. The drawing unit 3 contains a number of balls 2. The drawing unit 3 or the drawing drum is driven by a motor (not illustrated) which is located in the bearing and supporting part 31 and executes a rotation about its bearing axis.

During the course of this rotation, the balls 2 are indiscriminately mixed up with one another in the interior of the drawing drum, wherein the balls 2 are arranged with a certain degree of randomness after a number of revolutions. The balls 2 are mixed in the drawing unit 3. The drawing unit 3 has an outlet 33 or a discharge opening 33, it being possible for balls 2 to be removed from the interior of the drawing drum or drawing unit 3 via said outlet or discharge opening after a specific number of rotations. Drawing drums or drawing units 3 of this kind can be designed in a variety of different ways which are well known in the prior art. All desired types of drawing drum with which the balls 2 are mixed and then a single ball 2 is randomly selected from the set of balls 2 present overall can be used within the scope of the invention.

The ball 2 is conveyed downward into the base 34 of the machine arrangement 4 through a hollow outlet or discharge stub 33 and recorded in a recording unit (not illustrated), wherein the respective mark on the ball, in particular a number, is automatically determined. If desired, the color of the ball and the shape of the legends printed on the ball can also be determined. The ball 2 may be filmed, wherein the recorded images of the balls from the region of the base 34 are displayed to the players on a monitor in line with legal requirements.

After the drawn ball 2 is evaluated and displayed, it is raised upward by means of a lifting apparatus 20 and returns to the region of the bearing and supporting part 31 by means of a ball guide 1.

The lifting apparatus 20 comprises an outer cylindrical cover 24 which is composed of transparent material, an elevator screw 21 with a screw axial direction which is oriented in a vertical direction, which elevator screw is driven so as to rotate about its screw axis by a motor (not illustrated in further detail in the figure) which is located in the region of the base 34. An internal cylindrical cover 22 is attached in the interior of the helical lifting apparatus 21, said cover being firmly connected to the helical lifting apparatus 21.

After it is drawn in the drawing drum 3 and registered or recorded in the region (not illustrated) of the base 34, a ball 2 enters the lower region of the lifting apparatus 20 and is borne between the elevator screw 21, the outer cylindrical cover 24 and the inner cylindrical cover 22. The rotating elevator screw 21 conveys the ball 2 upward. In the process, the ball 2 is again visible to the players. An outlet 23 through which the individual balls enter a ball guide 1 is provided at the upper end of the lifting apparatus 20. An outwardly projecting termination piece is located at the upper end of the elevator screw 21, said termination piece pushing or deflecting the ball 2 into a outlet 23 which is located at the upper end of the jacket of the outer cylindrical cover 24 of the lifting apparatus 20.

However, as an alternative to the illustrated lifting apparatus 20, any other desired lifting apparatus which lifts the respective ball 2 upward after it is detected in the region of the base 34 can also be used. The lifting apparatus 20 respectively has an outlet 23 at the upper end, to which outlet a ball guide is connected.

In this preferred embodiment of the invention, the ball guide 1 is arranged helically around the lifting apparatus 20. One end of the ball guide 1 is connected to the outlet 23 of the lifting apparatus 20, the opposite end of the ball guide 1 issues into a continuous recess 38 which runs through the bearing and supporting part 31. In the region in which the ball guide 1 issues, the bearing and supporting part 31 has a continuous recess 38 which runs along the rotation axis of the drawing unit 3 and issues into the drawing unit 3. This continuous recess 38 is large enough for a ball 2 to roll or slide through it. An inlet barrier (not illustrated) which prevents balls 2 from running from the ball guide 1 into the drawing drum 3 during play is advantageously provided on the bearing and supporting part 31. In this case, the ball guide 1 is dimensioned to be long enough for a certain number of balls 2 to be stored. If desired, it is possible to prevent a ball 2 from being drawn twice during the same game in this way. If the rules of a game require a ball 2 to be able to be drawn more than once during a game, the inlet barrier can be omitted or continuously open. After completion of the game, the inlet barrier can be opened, so that all the drawn balls can return to the inner region of the drawing drum 3.

In this advantageous refinement of the invention, the mouth portion of the ball guide 1 into the bearing and supporting part 31 or into the drawing drum 3 is characterized by a steeper incline than the other sections of the ball guide 1, so that the balls 2 can return to the drawing drum 3 in any case when the inlet barrier is opened after completion of a game.

The ball guide 1 has a body 10 for accommodating and guiding balls 2 of the predefined size, wherein a predefined path 12 along which the balls run during the course of their movement is defined by the body 10. The path 12 is substantially helical, wherein the path which is taken by the center of gravity or center point of a ball 2 through the ball guide 1 is illustrated by dashed lines in FIG. 2. The body 10 of the ball guide comprises a number of guide rods 13 which run along the predefined path 12 and run at a parallel distance from one another. In the present case, the guide rods 13 are curved and in the form of a helix and run from the outlet 23 of the lifting device 20 to the bearing and supporting part 31. The individual guide rods 13 are spaced apart in such a way that a ball 2 of the predefined size can run between them, wherein it is ensured, however, that the ball 2 does not fall through between in each case two guide rods 13.

In this preferred embodiment, the predefined path 12 is selected such that a ball 2 which is released at the outlet 23 of the lifting apparatus 20 can run as far as the bearing and supporting part 31 at the end of the ball guide 1 solely due to the force of gravity, without additional external triggers. The guide rods 13 are held at a predefined distance from one another at predefined intervals by cross-connections 15. In this particular embodiment, the cross-connections 15 have an annular shape, wherein the cross-connections have recesses through which the respective guide rods 13 pass. The guide rods are connected to the cross-connections 15 in the region of these recesses. In this specific refinement of the invention, all of the cross-connections have this shape.

The ball guide 1 is supported on the base 34 or on the lifting apparatus 20 by means of supporting rods 14. The ball guide 1 is supported on the bearing and supporting part 31 by way of a further supporting rod or strut 16. As an alternative, the further supporting rod 16 or strut 16 can also be supported on the base 34 or else on the lifting device 20. A vibration transmitter 11 is arranged on the further supporting rod 19. The vibration generator 11 is connected to the body 10 by means of a strut 16 so as to transmit vibrations. In the present case, the strut 16 is designed like the supporting rods 14, and, in this particular embodiment, consists of a hollow metal pipe. The strut 16 acts on one of the cross-connections 15 at a predefined position 18 and advantageously transmits the vibrations generated by the vibration transmitter 11 to the body 10 of the ball guide 1, and therefore to the guide rods 13 and the cross-connections 15. The entire ball guide 1 is made to mechanically vibrate on account of the propagation of the vibrations into the guide rods 13. If a ball 2 is stuck between two guide rods 13 or between two guide rods 13 and a cross-connection 15, the ball 2 can be shaken free from its position and guided further along the predefined path 12.

As an alternative, the ball guide 1 or its body 10 can also be formed in a tubular manner from transparent plastic. In this alternative embodiment, the strut 16 can be directly mechanically connected, for example screwed or adhesively bonded, to the body 10.

In order to reduce the risk of balls 2 becoming stuck as they move through the ball guide 1, the invention now makes provision for at least one vibration transmitter 11 which is connected to the body 10 so as to transmit vibrations to be provided. In this particular embodiment of the invention, the vibration transmitter 11 is arranged in a housing which is connected to a cross-connection 15 of the body 10 by means of the strut so as to transmit vibrations. The vibrations of the vibration transmitter 11 can therefore be transmitted directly from the vibration transmitter 11 to the cross-connections by means of the strut 16 and to the guide rods 13 by means of said cross-connections, so that stuck balls 2 can be quickly shaken free.

Figure 3:
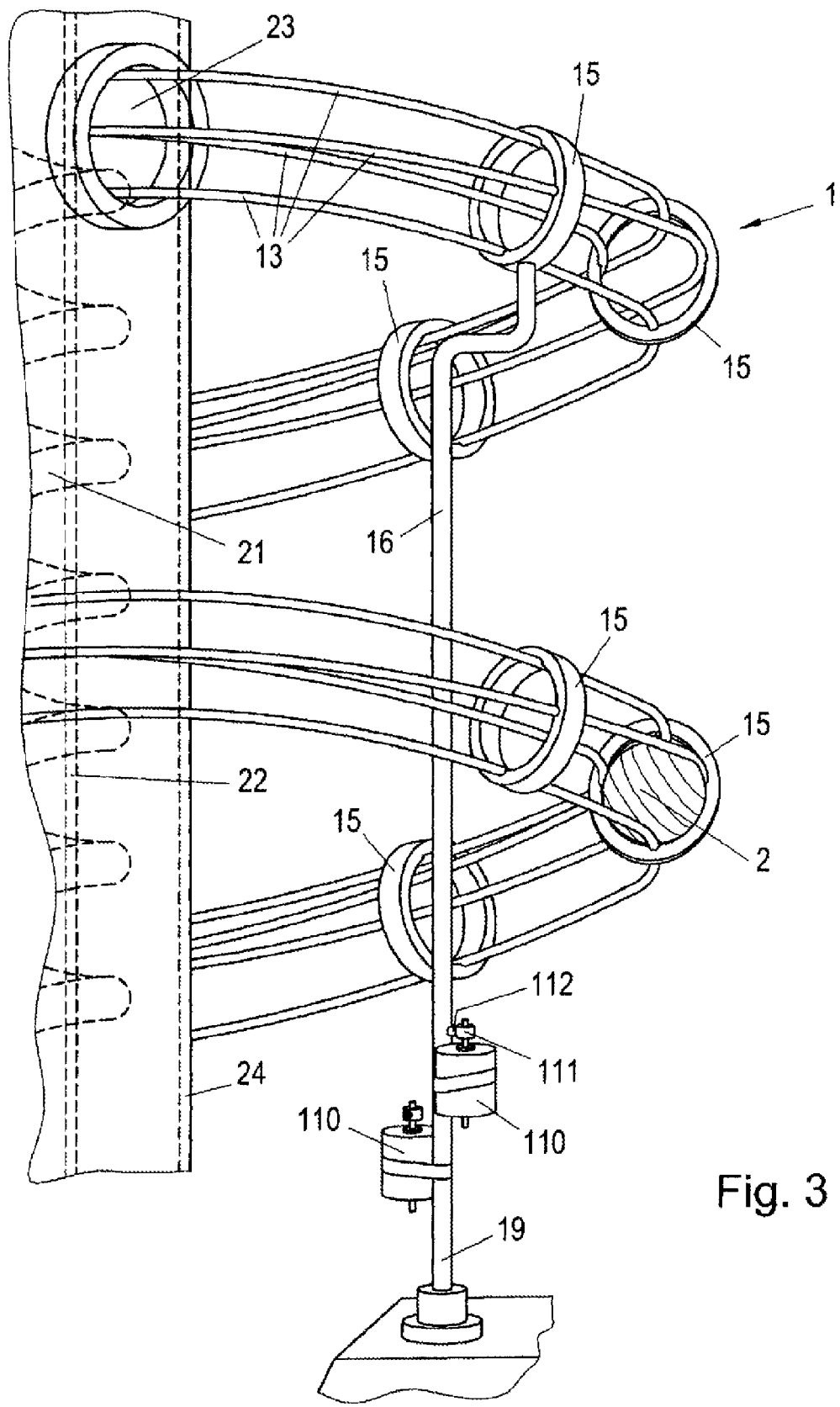
FIGS. 3 and 4 show, in detail, the vibration transmitter which is fitted on the ball drawing machine.
Figure 4:
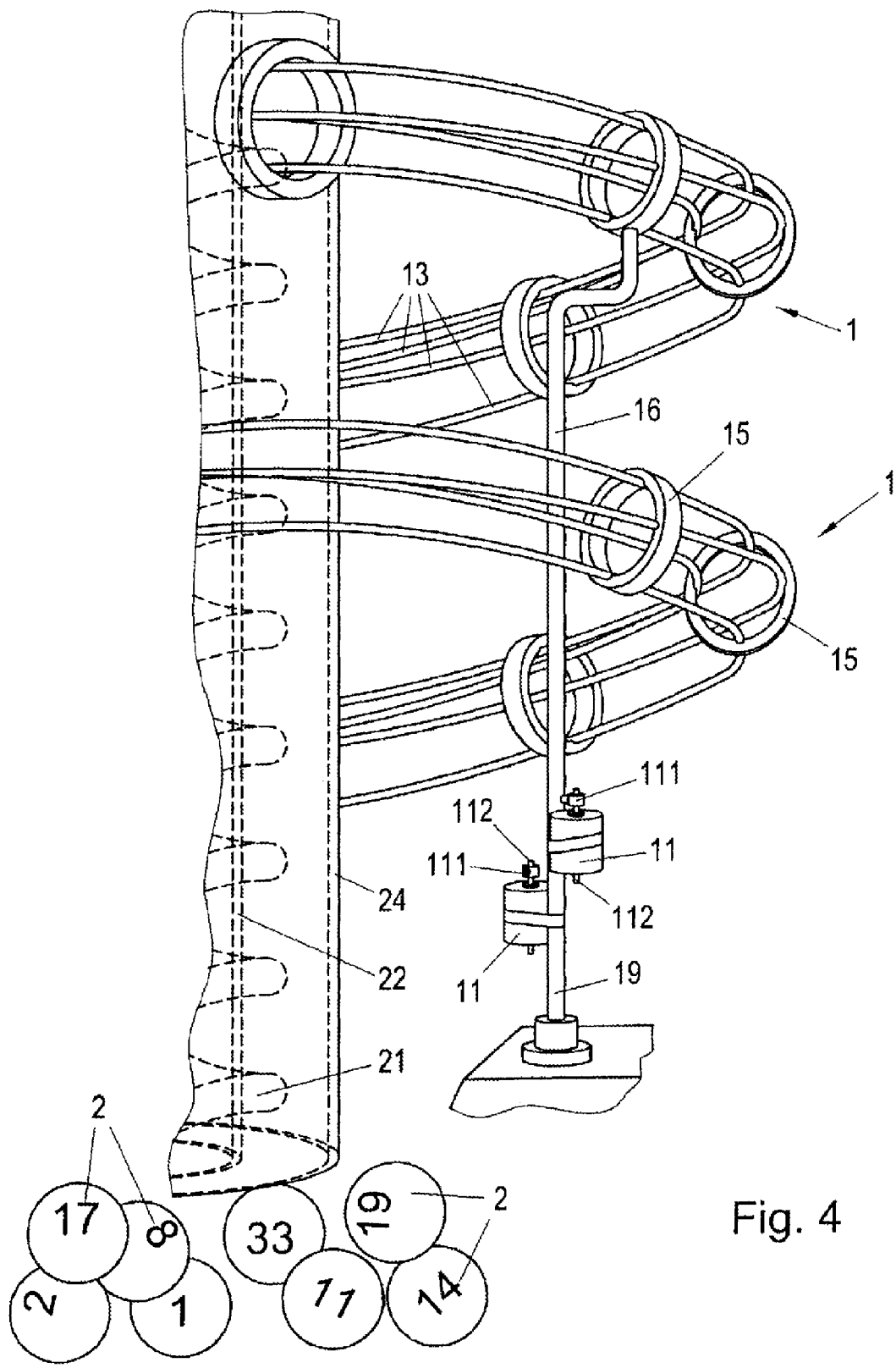
Figure 5:
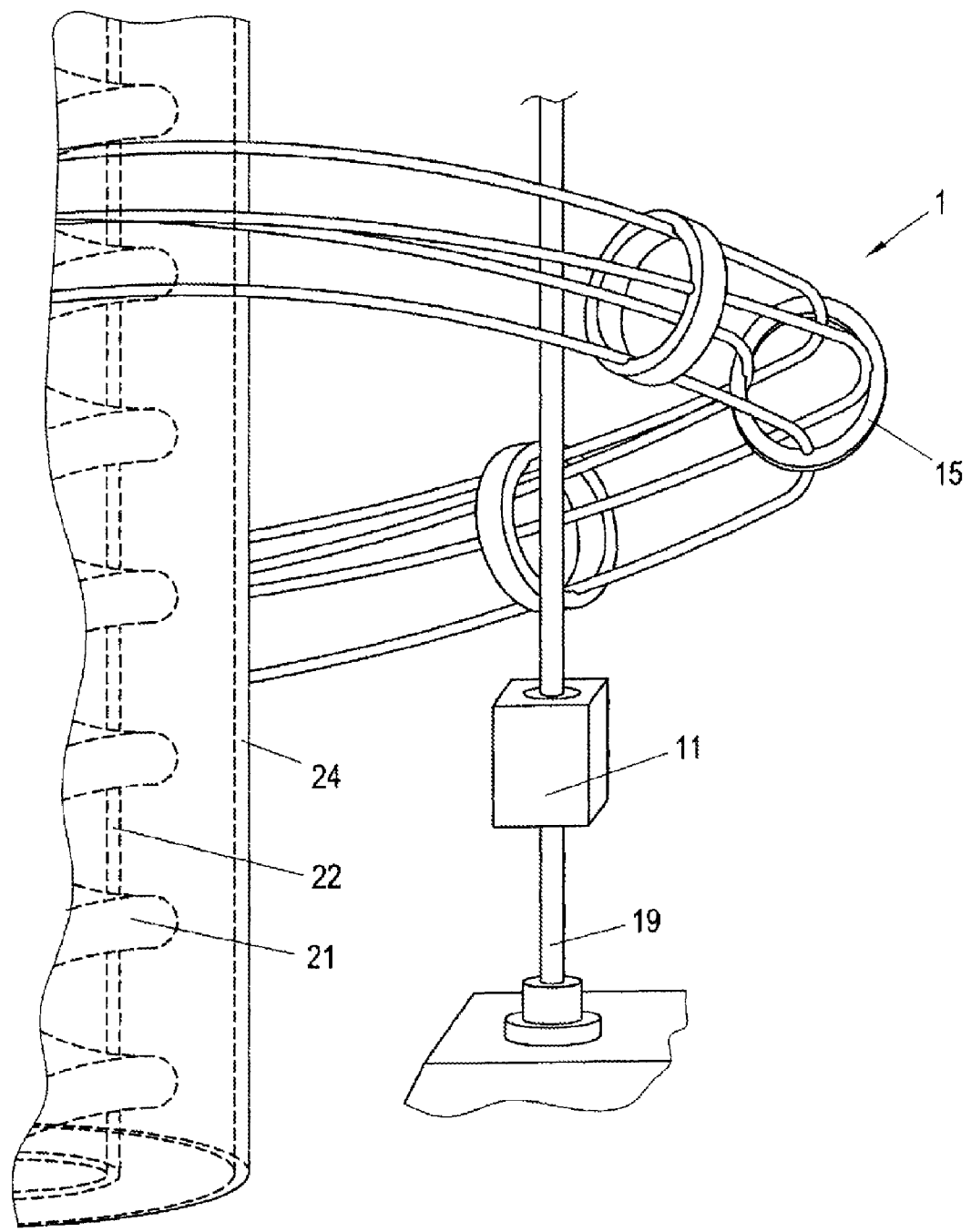
FIG. 5 shows the connection between the vibration transmitter and the ball guide.

In this advantageous refinement of the invention, the housing of the vibration transmitter 11 contains two electric motors 110 which each have a motor shaft 112. An eccentric weight 111 is arranged on the motor shaft 112, the center of mass of said eccentric weight not lying on the axis of the motor shaft 112 of the electric motor 110. In the text which follows, the electric motor 110 of which the vibration properties have been modified by the arrangement of an eccentric weight 111 is called an eccentric motor or unbalance motor 110. As illustrated in FIG. 3, the two eccentric motors or unbalance motors 110 are connected to the strut 16 by means of connecting elements, for example cable ties. As an alternative, the two eccentric motors 110 can also be screwed to the strut 16.

As an alternative to the arrangement with two eccentric motors 110 illustrated in FIG. 3, a single eccentric motor 110 which transmits a correspondingly large amount of vibration energy to the strut 16 and therefore to the ball guide 1 can also be used.

As an alternative, instead of the vibration transmitter, the vibrating part of said vibration transmitter, for example the eccentric weight of said vibration transmitter, can also be connected to the strut 16 and therefore to the ball guide 1 so as to transmit vibrations. As already mentioned, the strut 16 can be connected either to one of the cross-connections 15 or else to one of the guide rods 13 so as to transmit vibrations. In particular, a point for the strut 16 to act on can be sought in such a way that the largest possible portion of the ball guide 1 is made to vibrate.

In order to achieve improved vibration of the entire ball guide or of the entire ball drawing machine, the vibration frequency of the vibration transmitter is set to the resonant frequency fR of the ball guide in this preferred embodiment of the invention. This is advantageously performed in a calibration step which takes place before play is started. In this case, the vibration transmitter 11 is set to a predefined underfrequency, wherein the frequency is increased in steps. The more strongly the ball guide 1 or the ball drawing machine 4 is made to vibrate by the vibration transmitter 11, the greater are the resonance properties at the respective frequency. By way of example, a vibration measuring apparatus can be arranged in any desired position of the ball guide 1 and a check can then be made to determine the set vibration frequency at which the ball guide or the ball drawing machine 4 has the greatest vibration amplitude. The vibration frequency of the vibration generator is varied within a predefined frequency range of approximately between 10 Hz and 1000 Hz and that frequency at which the resonance is the greatest is sought.

In the embodiment illustrated in FIG. 3, the motor rotation speed of the respective eccentric motor or unbalance motor 110 can be varied in order to set the vibration frequency. In the present exemplary embodiment, the vibration frequency corresponds exactly to the motor rotation speed.

The present particular embodiment of the invention further comprises a unit (not illustrated) which is designed to establish that a ball 2 has become stuck in the ball guide 1. If a ball 2 is stuck in the ball guide 1, the unit emits a signal which activates the vibration transmitter 11. During the movement of the ball 2 in the ball guide 1, the unit checks whether a ball is stuck in the ball guide 1. If the ball 2 is stuck in the ball guide 1, the ball guide 1 is made to vibrate or oscillate.

The unit can be designed in an extremely wide variety of ways.

In particular, provision can be made for a light barrier which is activated as soon as a ball crosses the light barrier to be provided in each case in the region of the outlet 23 of the lifting apparatus 20 and in the end region of the ball guide 1, that is to say for example in the region of the bearing and supporting part 31. The light barrier is advantageously arranged in one of the cross-connections 15. When a ball 2 passes the light barrier which is located in the region of the outlet 23, the same ball 2 passes the light barrier which is situated at the end of the ball guide after a predefined time, in particular a time which is predefined by the length of the ball guide. If the ball 2 becomes stuck, however, it passes the light barrier which is located in the outlet 23 of the lifting device 20 but not the light barrier which is positioned at the end of the ball guide 1. Therefore, the following procedure can be followed in order to establish whether a ball has become stuck:

Once one of the balls 2 has crossed the light barrier which is located in the upper outlet 23 of the lifting device 20, a timer unit is started and, once the ball has crossed the light barrier at the end of the ball guide 1, the timer unit is stopped and reset. If the value indicated by the timer exceeds a predefined threshold value, the ball is judged to have become stuck and the unit for establishing a stuck ball 2 emits a corresponding electronic signal to the vibration transmitter 11. The vibration transmitter 11 is activated and makes the ball guide vibrate, so that the ball is released from its jammed position and can continue to run along the ball guide 1. Consequently, the ball 2 passes the light barrier which is positioned in the end region of the ball guide 1, and the timer is stopped and reset in response. From this point on, the unit does not emit any more signals to the vibration transmitter 11, the vibration transmitter 11 is deactivated and the next ball 2 can be drawn.

As an alternative, the vibration transmitter can also be operated in a steady or pulsed permanent mode, as a result of which the process of establishing that balls have become stuck can be dispensed with.

The vibration amplitude is selected such that the vibration is not visible to the naked eye and, in particular, is not audible.

As an alternative, a large number of struts 16 can also be provided, a vibration transmitter 11 being arranged on each of said struts, wherein oscillations or vibrations are transmitted to different subregions of the ball guide 1.

As an alternative to the design as a supporting structure by means of a strut or struts 16, a suspended structure can be provided by means of suspension rods for holding the ball guide 1. This suspended structure can be fitted, for example, to the cover 35.

Instead of the electric motor as a vibration transmitter 11, a solenoid can also be used, said solenoid with electromagnetic forces which are generated between a moving coil and a magnetic vibration element, wherein the magnetic vibration element is composed of a yoke and a magnet, when alternating current is supplied to the moving coil. Electrical vibration elements of this kind have long been used in electromagnetic bells. As an alternative, it would also be possible to modify an electromagnetic bell in such a way that the hammer strikes the strut 16. If, as in the present case, the strut 16 passes through the housing of the vibration transmitter, the hammer can act on the strut 16 in the interior of the housing, so that vibrations are transmitted to the ball guide.

The invention claimed is:

1. Ball drawing machine comprising:
a drawing unit for accommodating and randomly selecting balls, comprising:
at least one ball guide for discharging drawn balls from, or for supplying balls to, the drawing unit; wherein;
the ball guide having a body for accommodating and guiding balls of a predefined size along a predefined path being defined by the body, wherein at least one vibration transmitter is connected to the body so as to transmit vibrations; and wherein
the body has a number of guide rods which run along the predefined path and are at a distance from one another and surround the predefined path in such a way that a ball of the predefined size can be guided along the predefined path between the guide rods; and wherein
the vibration transmitter is connected to a strut so as to transmit vibrations, and the strut is connected to the body.

2. The ball drawing machine as claimed in claim 1, wherein the vibration transmitter is formed by an eccentric motor, wherein an eccentric weight is arranged on an output shaft of the eccentric motor.

3. The ball drawing machine as claimed in claim 1, wherein the guide rods run parallel to one another and define the predefined path, and/or in that the guide rods are firmly held in relation to one another at a number of positions, which are predefined along the predefined path and are spaced apart, along the predefined path, by cross-connections, wherein the cross-connections have a central recess for feeding through a ball.

4. The ball drawing machine as claimed in claim 3, wherein the vibration transmitter or a vibrating part of the vibration transmitter is connected to one of the cross-connections so as to transmit vibrations.

5. The ball drawing machine as claimed in claim 1, wherein the body is tubular and is transparent composed of transparent plastic, wherein the path runs in the interior of the body.

6. The ball drawing machine as claimed in claim 1, wherein the ball guide comprises a unit for establishing that a ball has become stuck in the ball guide, wherein the unit activates the vibration transmitter when it is established that a ball has become stuck.

7. The ball drawing machine as claimed in claim 1, wherein the vibration transmitter is set to a frequency which corresponds to a resonant frequency (fR) of the ball guide.

8. A method for guiding balls in a ball drawing machine as claimed in claim 1, wherein at least one ball is guided and/or moved in the ball guide, and the ball guide is made to vibrate or oscillate.

9. The method as claimed in claim 8, wherein a resonant frequency (fR) of the ball guide is determined by calibration in advance and the ball guide is subjected to oscillation or vibration at the resonant frequency (fR) determined.

10. The method as claimed in claim 8, wherein during the movement of the ball in the ball guide, a check is made to determine whether a ball is stuck in the ball guide, and the ball guide is made to vibrate or oscillate only if the ball becomes stuck in the ball guide.

\* \* \* \* \*